(12) United States Patent
Corbett, Jr.

(10) Patent No.: US 7,616,119 B2
(45) Date of Patent: Nov. 10, 2009

(54) METHOD OF LOCATING PIPELINES USING RFID TECHNOLOGY

(76) Inventor: Bradford G. Corbett, Jr., 1300 E. Berry St., Fort Worth, TX (US) 76119

( * ) Notice: Subject to any disclaimer, the term of this patent is extended or adjusted under 35 U.S.C. 154(b) by 290 days.

(21) Appl. No.: 11/598,408

(22) Filed: Nov. 13, 2006

(65) Prior Publication Data
US 2007/0057769 A1    Mar. 15, 2007

Related U.S. Application Data

(63) Continuation-in-part of application No. 11/033,210, filed on Jan. 11, 2005, now Pat. No. 7,158,034.

(51) Int. Cl.
*G08B 13/14* (2006.01)
(52) U.S. Cl. .......... 340/572.1; 340/10.1; 340/572.8
(58) Field of Classification Search ........ 340/572.1, 340/10.1, 572.8, 572.9, 539.1, 825.36, 825.49; 277/314, 608, 609, 625
See application file for complete search history.

(56) References Cited

U.S. PATENT DOCUMENTS

| | | | |
|---|---|---|---|
| 5,151,657 A | 9/1992 | Tashjian | 324/326 |
| 6,003,376 A | 12/1999 | Burns et al. | 73/584 |
| 6,252,538 B1 | 6/2001 | Chignell | 342/22 |
| 6,377,203 B1* | 4/2002 | Doany | 342/44 |
| 6,657,586 B2* | 12/2003 | Turner | 342/357.07 |
| 6,759,968 B2* | 7/2004 | Zierolf | 340/854.8 |

* cited by examiner

*Primary Examiner*—Toan N Pham
(74) *Attorney, Agent, or Firm*—Charles D. Gunter, Jr.

(57) ABSTRACT

A system is shown for locating hidden pipelines, particularly underground pipe used in a plastic pipeline such as for municipal water and sewer applications. An RFID tag is associated with the pipeline prior to installation of the pipeline into the ground. This can be done by associating the RFID tag with a sealing gasket which is subsequently installed at a sealing joint location of the pipeline. The tag can also be associated with the pipeline itself by installing the tag on a section of pipe. The location of the subsequently buried pipeline can be determined by interrogating the RFID tag with a suitable reader, the reader being located at an above ground location.

5 Claims, 2 Drawing Sheets

METHOD OF LOCATING PIPELINES USING RFID TECHNOLOGY

1. CROSS REFERENCE TO RELATED APPLICATIONS

The present application is a continuation-in-part of earlier filed application Ser. No. 11/033,210, filed Jan. 11, 2005, now U.S. Pat. No. 7,158,034 by the same inventor.

BACKGROUND OF THE INVENTION

1. Field of the Invention

The present invention relates to radio frequency identification (RFID) systems for identification, marking and tracking of selected items, and more specifically to one embodiment of such a system for locating pipelines and components thereof of the type used in water, sewage and other types of fluid conveyance systems.

2. Description of the Prior Art

There exists a need in a number of different industries for improvements in the way that items are identified, marked and tracked. This is especially true where a large number of items must be separated, identified, counted and sorted. One example is the manufacture of sealing gaskets for use in water, sewage and fluid conveyance systems generally. Present day means for solving this problem typically use manual workers who sequentially sort amongst the many items, picking single items manually and identifying the items visually. This solution is unsatisfactory because it is both slow and expensive, due to the high reliance on manual labor, and because mistakes occur in identifying and sorting the items. There is also a need for inventory control, for example, at the wholesaler's warehouse.

Various solutions have been proposed to automate the above process which involve the use of either bar codes or various other types of optical readers. For example, identification schemes which relay upon reading bar codes or other optical indicia are not well suited for use in the sorting of flat goods rather than contoured items. However, in the case of gasket manufacture, the items in question range in size from very small to large and are typically processed in a variety of orientations which are problematical for line of sight reading devices. There are other barriers and obstacles to the accurate machine identification and automated counting and sorting of sealing gaskets of the type under consideration.

For example, sealing gaskets are typically either extruded or compression molded, both being relatively high temperature and pressure operations. Whether the identifying "tag" is molded into the rubber of the gasket or merely affixed in some way to the gasket exterior, it must be robust enough in construction to withstand the influences present in the normal manufacturing environment The tag must also be provided at an acceptable cost to allow it to be utilized in mass production operations. These type demands have frustrated efforts to adapt bar codes and other optical indicia to sealing gasket technology. The lack of a viable coding and sorting solution for this segment of the fluid conveyance and sealing technologies has resulted in high labor costs, lack of stock control, and reduced profits.

A need thus exists for a marking and tracking technology that has the ease of use and the low cost associated with bar codes, and yet is more robust and tolerant of the conditions found in large scale industrial manufacturing plants for sealing gaskets and other similar environments.

There is also a need for improvements in the way pipelines and components of pipelines are located, including underground municipal piping having sealing gaskets of the aforementioned type. Municipal piping constitutes the form of transportation that is used to provide liquids, such as water, and gases, such as natural gas, to residential or commercial properties. Piping of this general type also removes waste from the household in the form of sewage. Such pipelines also include plastic fittings as components thereof.

In the case of municipal piping, it is a common practice to bury the water, gas and sewer pipes underground, as to provide easy access to residential or commercial locations. In addition to allowing easy access to the desired location, pipes are buried in order to save space above ground, to create an aesthetically pleasing environment, and to protect the pipes from damage and natural wear that the pipe could possibly be exposed to if they were located on the surface. However, pipes located underground still periodically need maintenance, or even to be replaced.

Before beginning maintenance or replacement on these underground pipes, they must first be located. Many times there are not readily available, or otherwise up to date, construction blueprints outlining the location of the buried pipe. In the case that blueprints are available for use, it is still common practice to employ a locating scheme in order to prevent erroneous digging. Furthermore, digging in locations that are mistakenly offset by less than a foot frequently results in damage to the pipe. If the pipe are metallic, it may be possible to locate the pipes through the use of some sort of metal detector. However, this technique does not apply to locating non-metallic pipes, such as pipes formed of plastic.

Therefore, a need exists to accurately and precisely locate underground pipes once buried, regardless if the pipe makeup is metallic or plastic. Present day means for solving this problem typically involve using tracer wire or magnetic location tape placed on the pipe itself. Tracer wire and magnetic location tape are used in conjunction with an electronic pipe finder. Tracer wire is typically a 12 gauge, coated, copper wire with watertight connecting splices. The tracer wire can be installed on top of the pipe or on the bottom. Tracer wires work reasonably well, but have a short lifetime once buried underground due to the effects of electrolysis. Once the tracer wire is installed, electronic pipe finders, which usually consist of a component to send a signal and a component to pick up a signal, are employed to locate the pipe. The transmitter component induces an electromagnetic field into any metallic objects buried into the ground within its range. As a receiver is carried over and across a pipe location, the induced electromagnetic field is detected by the receiver, thereby providing the user with the location of the buried pipe.

There are also several mechanical designs which have been used to locate underground pipe. U.S. Pat. No. 5,151,657 teaches an apparatus intended to be used with equipment that is inserted into an underground pipe of conduit. The invention includes a head that is attached to a member such as a hose or cable that has a wire attached thereto along its length. In order to function, the invention requires access to a known location of the underground pipe. The hose or cable is fed into a known opening in the pipe and allowed to travel a desired distance. The wire is connected to a signal generator which provides a signal to be detected by a receiver above ground to provide the location of the member and its depth, thereby supplying a method to track the direction, depth, and location of the buried pipe.

Various solutions have been proposed, as an alternative to the above process, to automate the locating process of buried pipes. These inventions most commonly involve the use of either acoustic signals or various other types of readers. For example, U.S. Pat. No. 6,003,376 teaches an acoustic method and apparatus for measuring the horizontal surface location and depth of any type of underground pipe, or conduit. The method applies to nonmetallic or nonconductive pipe, which cannot be detected with electromagnetic locators. A continuous-wave acoustic signal is injected into and transmitted through the fluid in the pipe. The horizontal surface location and depth of the pipe are determined from an analysis of the phase measurements derived from an array of acoustic measurements, which are made at the surface and approximately perpendicular to the direction of the underground pipe. However, this and similar systems are complex and expensive to purchase and maintain.

U.S. Pat. No. 6,252,538 discloses a system for locating and identifying underground pipes which utilizes a ground-probing radar, including an antenna module and a transmit/receive sub-system. Through a complex system of digital signal processing and data extraction, the invention detects differences in dielectric constants with a master controller. The system further includes a positioning sub-system, a display sub-system, a user interface and a data storage mechanism.

From the foregoing discussion, it should be apparent that a need continues to exist for improved locating technology that can quickly and accurately locate any number of underground pipe or pipe components.

A need also exists for such a locating technology that is easy to use and economical to manufacture, and yet is robust and tolerant and capable of functioning for an extended life time.

A need also exists for locating pipes which are in hidden locations other than below ground, for example, behind walls in a building.

SUMMARY OF THE INVENTION

In one embodiment of the present invention, the previously stated needs are met by providing a marking and identification system which includes the steps of providing a radio frequency identification device (RFID) of a suitable size and configuration for the particular task at hand; attaching at least one such RFID to a sealing gasket to be marked and identified; and subsequently interrogating the RFID by means of a suitable reader to thereby obtain identifying information about the particular sealing gasket which is so marked.

In another embodiment of the present invention, a method of locating an underground pipe is shown in which a wireless RFID is associated with the underground pipeline or pipeline component. The RFID can be associated with the pipe in several different ways. The RFID may be directly attached to an exterior or interior surface of the pipe, embedded within the pipe walls during construction of the pipe, or alternatively the RFID may be placed inside a sealing gasket that is then installed inside the pipe. The RFID is subsequently interrogated by means of a suitable reader to thereby obtain identifying information about the precise location of the underground pipe. By using this method, the exact location of the underground pipe can be quickly and easily determined, thereby eliminating erroneous digging or damage to the pipe that may occur while searching for the location of the buried pipe. The same method can be used to located other types of pipes which are hidden, for example, behind the walls of a building or other structure.

Additional objects, features and advantages will be apparent in the written description which follows.

DETAILED DESCRIPTION OF THE INVENTION

Figure 1:
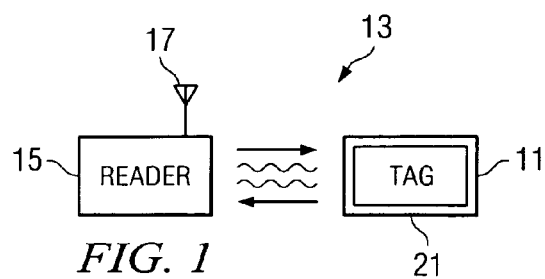
FIG. 1 is a block diagram of a wireless communication system which includes a tag for placement on a sealing gasket and an associated reader.

The system of the invention uses wireless radio frequency identification devices (RFID's) to mark, track and identify items of interest, such as the sealing gaskets used in fluid conveyance systems including municipal water and sewer lines. The system also allows a user to quickly and easily determine the location of a hidden pipeline, such as an underground pipeline.

RFID technology will first be described in general terms before turning to the more specific end applications of the invention. Whereas RFID's were, in the past, cost prohibitive, such devices can now be purchased commercially for on the order of 20 to 30 cents apiece, making them suitable for the purposes of the present invention. RFID tags are now well-known and typically include an integrated circuit (IC) that is operatively coupled to an antenna (the tag antenna). The tag may also have a battery, or it may have no battery and may instead obtain energy from an external reader. RFID tags without batteries may be preferred for applications in which lower cost is a dominant factor, and RFID tags with batteries may be preferred for applications in which a longer read range is preferred. Either or both may be used in conjunction with the present invention. The RFID tags of the present invention preferably resonate in the UHF or microwave frequency band, either of which enables an RFID reader to interrogate the tags from a sufficiently long read range to be useful.

The IC associated with an RFID tag typically includes a certain amount of memory in which a tag identifier is stored, and perhaps other information related to the tag, and/or the item or items with which the tag is to be associated. When an RFID reader (also known as an interrogator, either of which may read or write information to an RFID tag) transmits energy via its reader antenna to interrogate the RFID tag, the tag responds with information from which the reader can obtain the RFID tag identifier or other information. The data, identifier, or information obtained by the RFID reader may then be compared to entries in a database of identifiers or to information associated with that RFID tag. In that manner, information regarding an RFID-tagged item may be obtained, updated, and provided to a user, and/or written to an RFID tag, perhaps even in real-time.

Presently available RFID systems operate in both low frequency (less than 100 megahertz) and high frequency (greater than 100 megahertz) modes. Unlike their low-frequency counterparts, high-frequency tags can have their data read at distances of greater than one meter, even while closely spaced together. New data can also be transmitted to the tags.

In the low-frequency system, an integrated circuit sends a signal to an oscillator, which creates an alternating current in the reader's coil. That current, in turn, generates an alternating magnetic field that serves as a power source for the tag. The field interacts with the coil in the tag, which induces a current that causes charge to flow into a capacitor, where it is trapped by the diode. As charge accumulates in the capacitor, the voltage across it also increases and activates the tag's integrated circuit, which then transmits its identifier code. High and low levels of a digital signal, corresponding to the ones and zeros encoding the identifier number, turn a transistor on and off. Variations in the resistance of the circuit, a result of the transistor turning on and off, cause the tag to generate its own varying magnetic field, which interacts with the reader's magnetic field. In this technique, called load modulation, magnetic fluctuations cause changes in current flow from the reader to its coil in the same pattern as the ones and zeros transmitted by the tag. The variations in the current flow in the reader coil are sensed by a device that converts this pattern to a digital signal. The reader's integrated circuit then discerns the tag's identifier code.

In the high-frequency system, an integrated circuit sends a digital signal to a transceiver, which generates a radio-frequency signal that is transmitted by a dipole antenna. The electric field of the propagating signal gives rise to a potential difference across the tag's dipole antenna, which causes current to flow into the capacitor; the resulting charge is trapped by the diode. The voltage across the capacitor turns on the tag's integrated circuit, which sends out its unique identifier code as a series of digital high- and low voltage levers, corresponding to ones and zeros. The signal moves to the transistor. The transistor gets turned on or off by the highs and lows of the digital signal, alternately causing the antenna to reflect back or absorb some of the incident radio frequency energy from the reader. The variations in the amplitude of the reflected signal, in what is called backscatter modulation, correspond to the pattern of the transistor turning on and off. The reader's transceiver detects the reflected signals and converts them to a digital signal that is relayed to the integrated circuit, where the tag's unique identifier is determined.

Referring now to FIG. 1, one embodiment of the marking, tracking and identification system of the invention will now be described. FIG. 1 shows, in block diagram fashion, a remote intelligent communication device or wireless communication device (RFID tag) 11 which comprises part of a communication system 13. The communication system 13 includes an interrogator unit or reader 15. The wireless communication device 11 communicates via wireless electronic signals, such as radio frequency (RF) signals, with the reader 15. Radio frequency signals including microwave signals are utilized for communications in a preferred embodiment of communication system 13. The communication system 13 includes an antenna 17 coupled to the reader 15.

Figure 2:
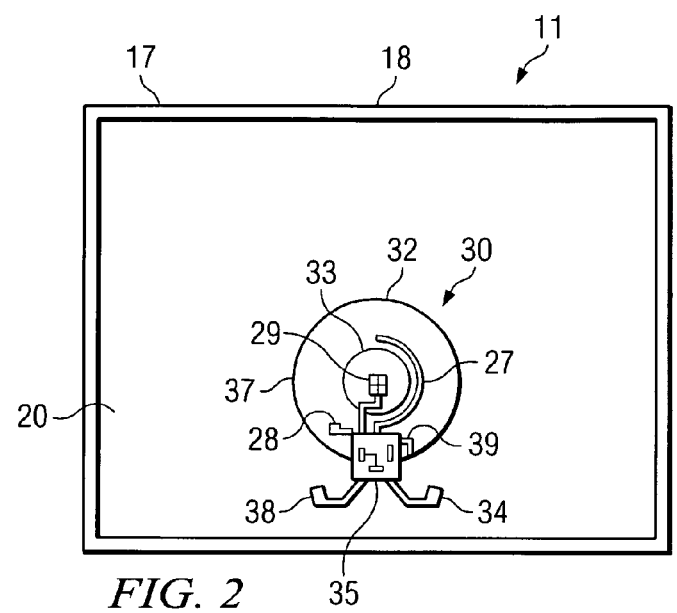
FIG. 2 is a front, partly schematic view of a wireless communication device of the type used in practicing the invention with the cover layer removed for ease of illustration.

Referring to FIG. 2, one form of the wireless communication device 11 which is useful for purposes of the present invention is shown. The device 11 is of the general type shown in issued U.S. Pat. No. 6,666,379, although it will be understood that other commercially available "tags" can be utilized, as well. The device 11 includes an insulative substrate or layer of supportive material 18. Example materials for the substrate 18 comprise polyester, polyethylene or polyimide film having a thickness of 3-10 mils.

Substrate 18 provides a first or lower portion of a housing for the wireless communication device 11 and defines an outer periphery 21 of the device 11. Substrate 18 includes a plurality of peripheral edges 17. A support surface 20 is provided to support components and circuitry formed in later processing steps upon substrate 18. In FIG. 2, support surface 20 comprises an upper surface of the layer shown.

A patterned conductive trace 30 is formed or applied over the substrate 18 and atop the support surface 20. A preferred conductive trace 30 comprises printed thick film (PTF). The printed thick film comprises silver and polyester dissolved into a solvent. One manner of forming or applying the conductive trace 30 is to screen or stencil print the ink on the support surface 20 through conventional screen printing techniques. The printed thick film is preferably heat cured to flash off the solvent and UV cured to react UV materials present in the printed thick film.

The conductive trace 30 forms desired electrical connections with and between electronic components which will be described below. In one embodiment, substrate 18 forms a portion of a larger roll of polyester film material used to manufacture multiple devices 10. In such an embodiment, the printing of conductive trace 30 can take place simultaneously for a number of the to-be-formed wireless communication devices.

The illustrated conductive trace 30 includes conductive lines and patterns, such as an electrical connection 28, a first connection terminal 29 and a second connection terminal 27. Conductive trace 30 additionally defines transmit and receive antennas 32, 34 in one embodiment of the invention. Antennas 32, 34 are suitable for respectively transmitting and receiving wireless signals or RF energy. Transmit antenna 32 constitutes a loop antenna having outer peripheral edges 37. Receive antenna 34 constitutes two elongated portions individually having horizontal peripheral edges 38.

Other antenna constructions are also possible. For example, both transmit and receive operations can be implemented with a single antenna in alternative embodiments of the present invention. Both antennas 32, 34 preferably extend or lie within the confines of peripheral edges 17 and outer periphery 21 and define a plane.

One embodiment of a wireless communication device 11 includes a power source 33, an integrated circuit chip 35, and capacitor 39. Power source 33, capacitor 39, and integrated circuit chip 35 are provided and mounted on support surface 20 and supported by substrate 18. The depicted power source 33 is disposed within transmit antenna 32 of wireless communication device 11. Capacitor 39 is electrically coupled with loop antenna 32 and integrated circuit 35 in the illustrated embodiment.

Power source 33 provides operational power to the wireless communication device 11 and selected components therein, including integrated circuit 35. In the illustrated embodiment, power source 33 comprises a battery. In particular, power source 33 is preferably a thin profile battery which includes first and second terminals of opposite polarity. More particularly, the battery has a lid or negative (i.e., ground) terminal or electrode, and a can or positive (i.e., power) terminal or electrode.

It is important for purposes of the present invention that the RFID be heat and pressure tolerant. In order to achieve this result, the electronic components are ultimately encapsulated, either chemically or physically, in a protective barrier type material or materials. In the embodiment illustrated in FIGS. 1 and 2, conductive epoxy is applied over desired areas of support surface 20 using conventional printing techniques, such as stencil or screen printing, to assist in component attachment described just below. Alternately, solder or another conductive material is employed instead of conductive epoxy. The power source 33 is provided and mounted on support surface 20 using the conductive epoxy. Integrated circuit 35 and capacitor 39 are also provided and mounted or conductively bonded on the support surface 20 using the conductive epoxy.

Integrated circuit chip 35 includes suitable circuitry for providing wireless communications. For example, in one embodiment, integrated circuit chip 35 includes a processor, memory, and wireless communication circuitry or transponder circuitry for providing wireless communications with reader 15.

One embodiment of transponder circuitry includes a transmitter and a receiver respectively operable to transmit and receive wireless electronic signals. In particular, transponder circuitry is operable to transmit an identification signal responsive to receiving a polling signal from reader 15. Specifically, the processor is configured to process the received polling signal to detect a predefined code within the polling signal. Responsive to the detection of an appropriate polling signal, the processor instructs transponder circuitry to output an identification signal. The identification signal contains an appropriate code to identify the particular device 11 transmitting the identification signal in certain embodiments. The identification and polling signals are respectively transmitted and received via antennas 32, 34 of the device 11.

First and second connection terminals 29, 27 are coupled to the integrated circuit 35 by conductive epoxy in accordance with a preferred embodiment of the invention. The conductive epoxy also electrically connects the first terminal of the power source 33 to the first connection terminal 29.

Subsequently, conductive epoxy is dispensed relative to perimetral edge 37 and electrically connects perimetral edge with connection terminal 27. In the illustrated embodiment, perimetral edge defines the can of the power source 33. The conductive epoxy connects the positive terminal of the power source 33 to connection terminal 27. The conductive epoxy is then cured. Thus, the integrated circuit and battery are conductively bonded relative to the substrate and to the conductive lines of trace.

An encapsulant, such as encapsulating epoxy material, is subsequently formed following component attachment. In one embodiment, the encapsulant is provided over the entire support surface 20. Such encapsulates or envelopes the antennas 32, 34, integrated circuit 35, power source 33, conductive circuitry 30, capacitor 39, and at least a portion of the support surface 20 of substrate 18. The encapsulant operates to insulate and protect the components (i.e., antennas 32, 34, integrated circuit 35, power source 33, conductive circuitry 30 and capacitor 39).

A flowable encapsulant is preferably applied over substrate 18 and subsequently cured following the appropriate covering of the desired components. In the preferred embodiment, such encapsulant constitutes a two-part off the shelf epoxy which typically includes fillers such as silicon and calcium carbonate. The preferred two-part epoxy is sufficient to provide a desired degree of flexible rigidity. Specifically, the preferred epoxy comprises a two-component system having a liquid resin material and a liquid hardener material. The resin typically constitutes three times the volume of the hardener within the liquid mixture from which the two-part system cures. Adequate and complete mixing of the resin/hardener two-component epoxy system occurs prior to dispensing or otherwise providing the liquid encapsulant atop the substrate, chip, and battery. Other encapsulant materials of the insulative layer can also be used in accordance with the present invention. Such encapsulation would preferably occur from fabrication of multiple device patterns formed on a single substrate sheet, and then cutting individual devices 11 from the sheet after encapsulation and cure.

Figure 3:
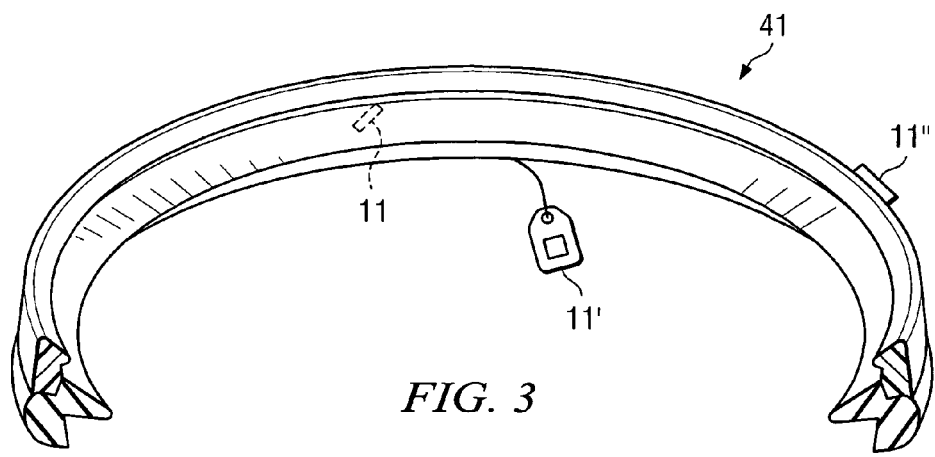
FIG. 3 is a simplified, perspective view of a sealing gasket having a tag of the invention attached thereto.

FIG. 3 shows a completed tag 11 which has been attached to a sealing gasket 41. The tag 11 allows the gasket to be properly tracked, identified and sorted.

In addition to the previously described chemical encapsulation method, it will be understood that the RFID's of the invention can be physically or mechanically isolated from various environmental factors, as well. The RFID's of the invention must be capable of existing in a variety of environments and must therefore be encapsulated or isolated for durability against chemical agents, shock, fluids, dust or dirt, and the like. Although a variety of tags are commercially available which will suffice in most retail and home environments, they must be isolated or protected to withstand the high temperature environment of, for example, a gasket manufacturing operation.

In additional envisioned embodiments of the invention, the electrical components are isolated from the environment by providing the substrate with a top and bottom comprised of substantially flexible, high temperature resistant materials. Preferably, the substrate with its electrical components are housed in a top and bottom layers comprised of a substantially flexible polymeric material such as a polyimid, for example, Kapton™. In one embodiment of the invention, the substrate is joined to top and bottom layers by means of a thermally resistant, substantially flexible silicone encapsulant on one side and with a high temperature adhesive on the other side. In a preferred embodiment, the silicone encapsulant can comprise Stycast™ 4952 (manufactured by Emerson & Cuming Specialty Polymers). The high temperature adhesive can comprise, for example, 3M®-9460PC, having a temperature rating in the range of 500° F.

Physically isolating the tag electronic components with thermally resistant materials provides a tag which exhibits superior thermal and shock resistance. The tag 11 is also substantially flexible and can be provided in thickness ranges of about 0.020 in. to 0.040 inches. Such tags should be capable of withstanding temperature ranges of approximately −40° C. to 300° C. The RFID tags can also be cycled to and from the survival temperature and the operating temperature range without adversely affecting the performance characteristics of the tags. The tags may thus be employed in the type of manufacturing environment in which sealing gaskets of the type under consideration are produced.

Figure 4:
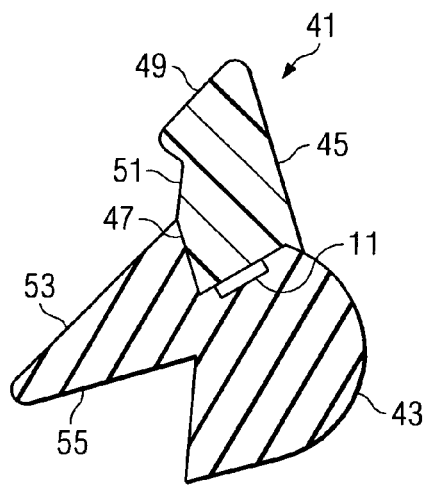
FIG. 4 is a side, cross sectional view of the gasket of FIG. 3, showing the identifying tag molded within the gasket body.

FIGS. 3 and 4 illustrate a first version of the identification system of the invention in which a sealing gasket 41 carries an associated RFID tag. The gasket 41 is generally described in issued U.S. Pat. No. 4,834,398, assigned to the assignee of the present invention. The gasket in question happens to be a "dual durometer" gasket, although it will be understood that other gasket types customary in the industry may be utilized, as well. As shown in FIGS. 3 and 4, the gasket body is integrally formed as a unitary member from a first portion 43 of a resilient, moisture proof material, such as a relatively low durometer natural or synthetic rubber to provide efficient sealing against within a pipe groove. The body also includes a second portion 45 formed of a harder, less resilient material which has a higher durometer than the material of the first portion 43. Suitable materials for the second portion 45 include hard plastic materials, such as polypropylene plastic or polyvinyl chloride plastic or relatively higher durometer rubber. In the preferred embodiment the second portion 45 is formed from rubber having a Shore A durometer on the order of 75 to 95 and the first portion 43 is formed from rubber having a Shore A durometer on the order of 40 to 65. By "integrally formed" body portions is intended to mean that the portions 43, 45 are bonded or otherwise joined along an angular boundary 47. The portions 43, 45 could be produced, for example, by extrusion, the portions 43, 45 being joined by gluing or vulcanization to form the unitary gasket 41.

The particular gasket shown in FIGS. 2 and 3 has an interior which includes a tapered entry surface 49 which joins an integrally formed band region 51. The band region 51 circumscribes the central longitudinal axis of the pipe joint and has a constant internal diameter with respect to the central longitudinal axis of the pipe joint during pipe joint assembly. The interior of the gasket body also has an inwardly extending projection 53 which includes an annular conical sealing surface which provides an elongated deformation length and serves as a sealing area with respect to the inner pipe during assembly. The inwardly extending projection 53 has a rear face 55 which forms and acute angle with respect to the remainder of the first portion 43.

Since two gasket sections 43, 45 are being joined in the manufacture of the unitary gasket body, the tag 11 of the invention can easily be located along the angular boundary 47 and either glued or molded within the gasket body. In this way, the tag would not be subject to the forces normally encountered in "belling" a pipe end in a Rieber type manufacturing process or during the pipe joint assembly in the field.

Where the identifying tag is merely being used in the warehouse for inventory control type purposes, it can also be affixed in any convenient manner to the gasket body, such as by the hang tag indicated as 11' in FIG. 3, or by merely affixing the tag 11" with a suitable glue or adhesive to the gasket exterior surface.

Figure 5:
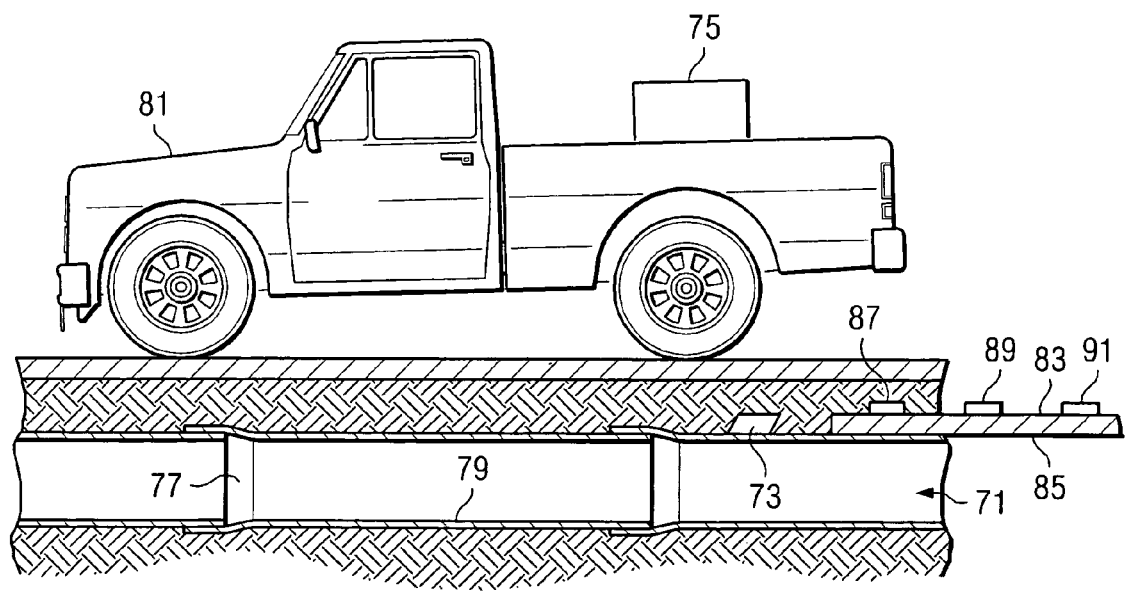
FIG. 5 is a simplified view of the underground pipeline location system of the present invention in use, the underground pipeline being shown in partial section for ease of illustration.

In addition to marking, tracking and identifying sealing gaskets, the system of the present invention can also be used to locate hidden pipelines such as underground pipes of the type used in fluid conveyance systems employed for municipal water and sewer lines. FIG. 5 illustrates the general environment of the present invention for locating buried pipeline 71. The RFID 73 is associated with the underground pipeline 71, and subsequently interrogated by means of a suitable reader 75 to thereby obtain identifying information about the precise location of the underground pipeline 71. As shown in FIG. 5, the reader 75 may be held by a passenger, or placed in a convenient position on a vehicle, such as a the truck 81, while driving over the proximity of the location of the buried pipeline 71. In one embodiment of the present invention, the RFID 13 is associated with the underground pipeline 71 by installing the previously described sealing gasket 77 within an internal groove provided in a belled end of a female pipe-section which is joined to a mating male pipe section to form a joint of the underground pipeline. In another embodiment of the present invention, the RFID 73 device may be placed on the body of the pipeline 71 itself. This might be on either an exterior surface or an interior surface of the pipe. For example, the RFID 73 is shown in FIG. 5 as being affixed to the exterior surface 79 of the pipeline 71 with a suitable glue or adhesive. Furthermore, the RFID 73 could be associated with the pipeline 71 by integrally installing the RFID 73 into the body of the pipeline 71 during the construction of the pipeline 71, as during the pipe extrusion process for a plastic pipe.

The RFID's could also be associated with the pipeline 71 in a number of other convenient ways. For example, as shown in FIG. 5, a roll of tape 83 having an adhesive backing 85 carries a plurality of RFID's 87, 89, 91. The tape is simply run along the length of the pipeline and adhered to the outer surface thereof.

It will also be understood that, while the invention has been described with respect to underground pipelines, the method of the invention could also be used to locate other types of hidden pipes, such as pipes hidden behind a wall of a structure.

An invention has been provided with several advantages. The RFID identification system of the invention can be used to track gasket inventory in a manufacturing plant or storage location. The tags can withstand both chemical attack, shock and temperature cycles likely to be encountered in the intended environment of use. The tags are reasonably priced, allowing them to be economically incorporated into, for example, a sealing gasket or pipe used in municipal water line applications. The tags may also be associated with buried or hidden pipelines, allowing for the pipelines or components thereof to be located quickly and accurately with a minimum of expense. The method can be used to located other types of hidden pipelines, as well, such as those hidden behind the walls of a building.

RFID technology has an additional advantage over the magnetic tapes of the prior art. The RFID chips are "intelligent" and can be interrogated for such information as the materials of the construction of the pipeline, the manufacturer, the date of installation, etc.

While the invention has been shown in only two of its forms, it is not thus limited but is susceptible to various changes and modifications without departing from the spirit thereof.

I claim:

1. A method of locating an underground pipe, the method comprising the steps of:
    providing a radio frequency identification device of a suitable size and configuration for a particular task at hand;
    associating at least one such radio frequency identification device with the underground pipe to located;
    subsequently interrogating the radio frequency identification device from an above ground location by means of a suitable reader to thereby obtain information identifying the location of the underground pipe; and
    wherein the pipe comprises an extruded plastic body, and wherein the radio frequency identification device is associated with the underground pipe by embedding the radio frequency identification device within the body of the pipe during pipe manufacturing operations so that the radio frequency identification device is integrally located within the pipe body.

2. A method of locating an under around pipe, the method comprising the steps of:
    providing a radio frequency identification device of a suitable size and configuration for a particular task at hand;
    associating at least one such radio frequency identification device with the underground pipe to located;
    subsequently interrogating the radio frequency identification device from an above ground location by means of a suitable reader to thereby obtain information identifying the location of the underground pipe; and
    wherein the radio frequency identification device is associated with the underground pipe by installing a sealing gasket within an internal groove provided in a female section of plastic pipe, and wherein the radio frequency identification device is carried by the sealing gasket.

3. The method of claim 2, wherein the radio frequency identification device is molded within the body of the sealing gasket during gasket manufacturing operations.

4. A method of locating an underground pipe, the method comprising the steps of:

providing a radio frequency identification device of a suitable size and configuration for a particular task at hand;

associating at least one such radio frequency identification device with the underground pipe to located;

subsequently interrogating the radio frequency identification device from an above ground location by means of a suitable reader to thereby obtain information identifying the location of the underground pipe;

wherein the radio frequency identification device is encapsulated in an encapsulating material which renders is impervious to normal environmental influences;

wherein the radio frequency identification device is encapsulated in a liquid resin which is subsequently cured;

wherein the radio frequency identification device is encapsulated in an epoxy resin;

wherein the radio frequency identification device is associated with the sealing gasket by attaching the radio frequency identification device to an exposed surface of the gasket with a suitable glue or adhesive.

5. A method of locating an underground pipe, the method comprising the steps of:

providing a radio frequency identification device of a suitable size and configuration for a particular task at hand;

associating at least one such radio frequency identification device with the underground pipe to located;

subsequently interrogating the radio frequency identification device from an above ground location by means of a suitable reader to thereby obtain information identifying the location of the underground pipe;

wherein the radio frequency identification device is encapsulated in an encapsulating material which renders is impervious to normal environmental influences;

wherein the radio frequency identification device is encapsulated in a liquid resin which is subsequently cured;

wherein the radio frequency identification device is encapsulated in an epoxy resin;

wherein the radio frequency identification device is associated with the sealing gasket by embedding the radio frequency identification device within the sealing gasket during a gasket molding operation.

* * * * *